US010752380B2

(12) United States Patent
Teo et al.

(10) Patent No.: US 10,752,380 B2
(45) Date of Patent: Aug. 25, 2020

(54) ACOUSTIC PANEL REPAIR WITH RETENTION OF ACOUSTIC PROPERTIES

(71) Applicant: ROHR, INC., Chula Vista, CA (US)

(72) Inventors: Chia Huat Teo, Singapore (SG); Chong Yaw Wee, Singapore (SG)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 16/325,163

(22) PCT Filed: Oct. 25, 2016

(86) PCT No.: PCT/US2016/058598
§ 371 (c)(1),
(2) Date: Feb. 12, 2019

(87) PCT Pub. No.: WO2018/080439
PCT Pub. Date: May 3, 2018

(65) Prior Publication Data
US 2019/0337642 A1 Nov. 7, 2019

(51) Int. Cl.
B64F 5/40 (2017.01)
B29C 73/10 (2006.01)
B29L 31/30 (2006.01)
B64C 1/40 (2006.01)
(Continued)

(52) U.S. Cl.
CPC ............... *B64F 5/40* (2017.01); *B29C 73/10* (2013.01); *B23B 49/02* (2013.01); *B23B 2247/04* (2013.01); *B29C 66/7254* (2013.01); *B29L 2031/3082* (2013.01); *B64C 1/40* (2013.01); *Y10T 29/49318* (2015.01);
(Continued)

(58) Field of Classification Search
CPC ............. Y10T 29/5105; Y10T 29/5107; Y10T 29/5108; Y10T 29/49318; Y10T 29/4973; Y10T 29/49732; Y10T 29/49618; Y10T 428/20; B23C 73/10; B23C 73/105; B23C 73/12; B29C 66/7254; B32B 37/146; B32B 2305/024; B23B 2270/06; B23B 49/02; B23B 2247/04
USPC ................ 83/17, 18, 19; 269/21; 408/19, 76
See application file for complete search history.

(56) References Cited

U.S. PATENT DOCUMENTS 2,855,664 A * 10/1958 Griffith .................. B23Q 3/086
29/424
2,905,064 A * 9/1959 Nielsen ................... B23P 25/00
269/7
(Continued)

FOREIGN PATENT DOCUMENTS

JP 08192484 A * 7/1996 ............. B29C 65/26

OTHER PUBLICATIONS

International Search Report and Written Opinion dated Jul. 25, 2017 in PCT Application No. PCT/US2016/058598.

*Primary Examiner* — Jason L Vaughan
(74) *Attorney, Agent, or Firm* — Snell & Wilmer L.L.P.

(57) ABSTRACT

An acoustic panel (200) for an aircraft nacelle (100) may comprise a perforated first skin (220), a second skin (230), and a core (210) sandwiched between them. A damaged portion of the perforated first skin may be removed. A fiberglass ply (510) may be coupled to the acoustic panel. A pressure differential may cause the fiberglass ply to form dimples (515) within the perforations (325) of the first skin. The fiberglass ply may be used as a template to drill holes in a replacement patch (400).

18 Claims, 9 Drawing Sheets

(51) Int. Cl.
  *B29C 65/00* (2006.01)
  *B23B 49/02* (2006.01)
(52) U.S. Cl.
  CPC .... *Y10T 29/49618* (2015.01); *Y10T 29/49732* (2015.01); *Y10T 29/5105* (2015.01)

(56) References Cited

U.S. PATENT DOCUMENTS

| | | | | |
|---|---|---|---|---|
| 3,093,370 | A * | 6/1963 | May | B23Q 3/086 |
| | | | | 269/309 |
| 3,176,387 | A * | 4/1965 | Argueso, Jr. | B23C 3/00 |
| | | | | 29/423 |
| 3,624,819 | A * | 11/1971 | Schickling | B23Q 1/032 |
| | | | | 408/92 |
| 3,697,630 | A * | 10/1972 | Yoshino | B64G 1/58 |
| | | | | 264/28 |
| 3,906,834 | A * | 9/1975 | Gladwin | B23C 3/16 |
| | | | | 409/132 |
| 4,445,956 | A * | 5/1984 | Freeman | B23Q 3/086 |
| | | | | 156/154 |
| 4,517,038 | A * | 5/1985 | Miller | B29C 73/10 |
| | | | | 156/94 |
| 5,653,836 | A * | 8/1997 | Mnich | B29C 73/02 |
| | | | | 156/98 |
| 6,090,729 | A * | 7/2000 | Jonas | B32B 5/18 |
| | | | | 442/180 |
| 6,149,749 | A * | 11/2000 | McBroom | B29C 73/02 |
| | | | | 156/87 |
| 6,656,299 | B1 * | 12/2003 | Grosskrueger | B29C 73/02 |
| | | | | 156/293 |
| 6,767,606 | B2 * | 7/2004 | Jackson | B32B 3/28 |
| | | | | 156/250 |
| 6,770,349 | B2 * | 8/2004 | Itoh | B29C 73/04 |
| | | | | 428/73 |
| 6,991,755 | B2 * | 1/2006 | Reis | B29C 73/06 |
| | | | | 156/98 |
| 7,069,830 | B1 * | 7/2006 | Meyer | E04C 2/365 |
| | | | | 29/897.1 |
| 1,859,922 | A1 | 11/2010 | Holland | |
| 7,875,141 | B2 * | 1/2011 | Bogue | B29C 73/06 |
| | | | | 156/153 |
| 7,935,205 | B2 * | 5/2011 | Bogue | B29C 73/06 |
| | | | | 156/252 |
| 8,967,330 | B2 * | 3/2015 | Comon | F02C 7/24 |
| | | | | 181/292 |
| 9,186,756 | B2 * | 11/2015 | Shigetomi | B32B 3/12 |
| 9,199,349 | B2 * | 12/2015 | Carl | B23Q 3/086 |
| 9,364,930 | B2 * | 6/2016 | Hethcock | B26F 3/004 |
| 9,815,546 | B2 * | 11/2017 | Mizuno | B64C 1/12 |
| 10,239,300 | B2 * | 3/2019 | Joslyn | B32B 37/12 |
| 2007/0275212 | A1 * | 11/2007 | Stadtlander | B29C 73/10 |
| | | | | 428/116 |
| 2010/0258236 | A1 | 10/2010 | Bogie | |
| 2010/0276505 | A1 * | 11/2010 | Smith | B23K 26/40 |
| | | | | 239/8 |
| 2014/0348603 | A1 * | 11/2014 | Miyajima | B25J 13/085 |
| | | | | 408/1 R |

\* cited by examiner

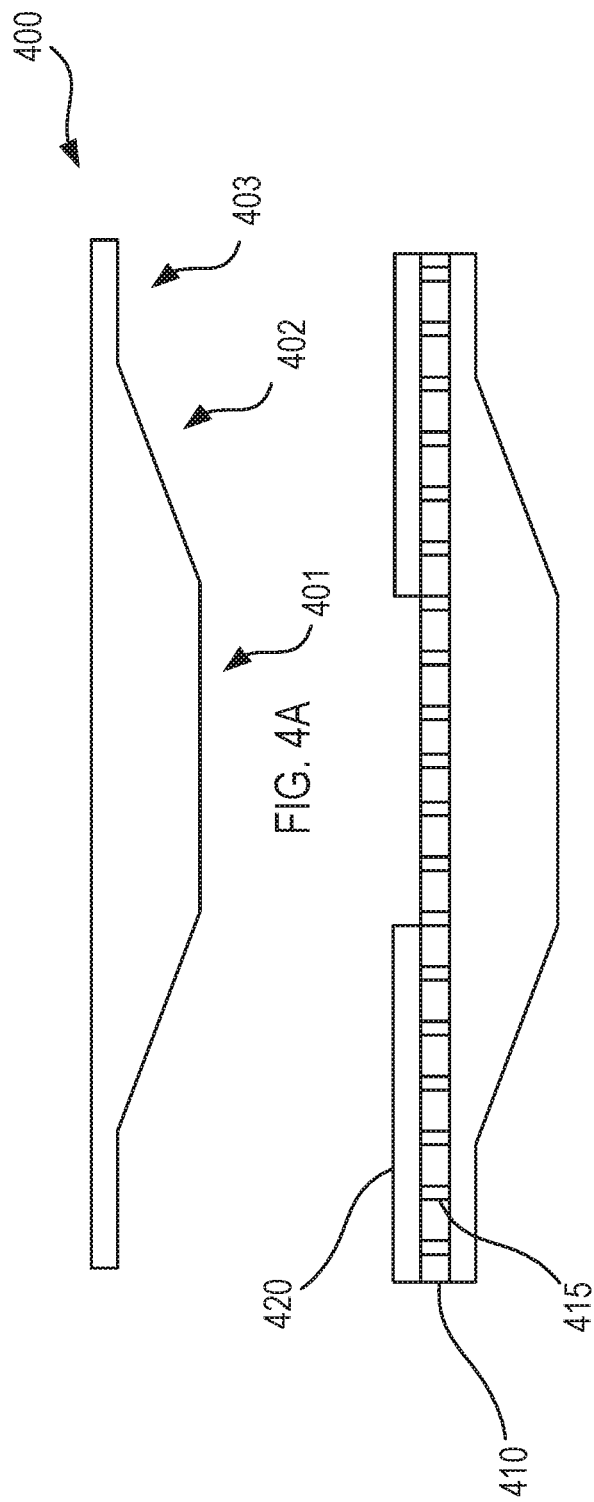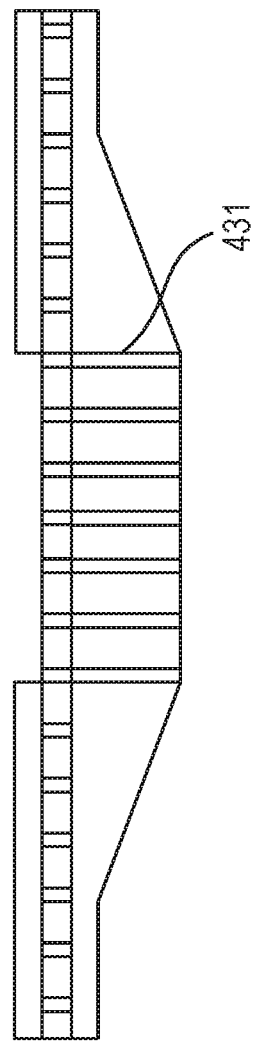

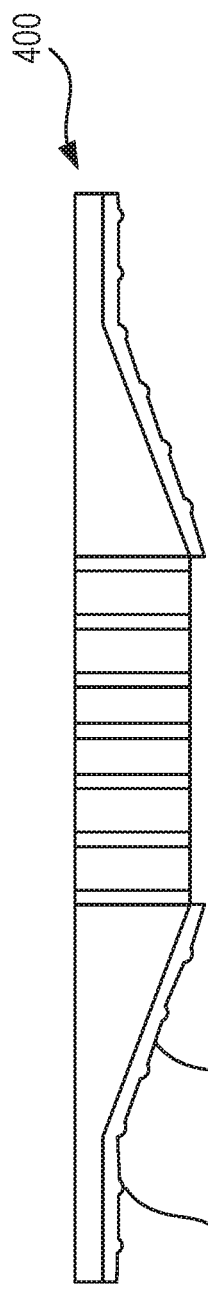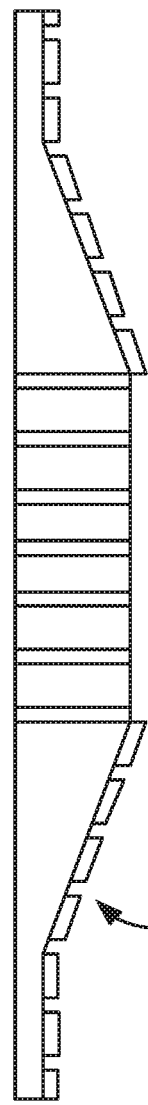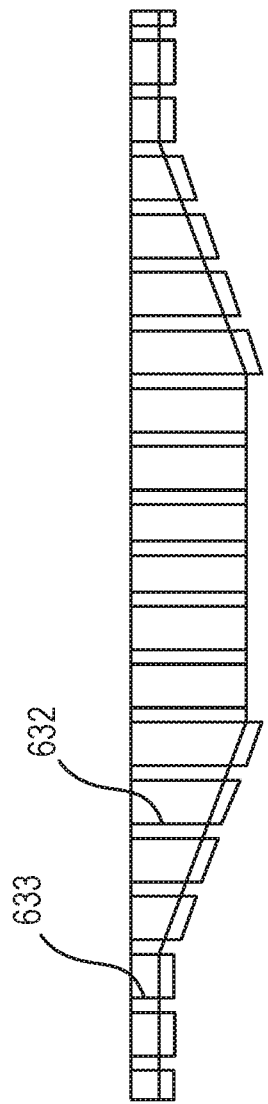

ACOUSTIC PANEL REPAIR WITH RETENTION OF ACOUSTIC PROPERTIES

CROSS-REFERENCE TO RELATED APPLICATIONS

This application is U.S. national phase filing under 35 U.S.C. § 371 of PCT/US2016/058598 filed on Oct. 25, 2016 and titled "ACOUSTIC PANEL REPAIR WITH RETENTION OF ACOUSTIC PROPERTIES." The '598 application is incorporated herein by reference in its entirety for all purposes.

FIELD

The present disclosure relates to acoustic panels, and more particularly, to a method of repairing acoustic panels while retaining their acoustic properties.

BACKGROUND

Aircraft nacelle structures for turbine engines typically include acoustic panels which include, for example, a back skin and a perforated top skin with a core material sandwiched there between. In some cases, the acoustic panel may be formed during manufacturing with an undesirable void between the top skin and the core, or the top skin may delaminate from the core material while in service, or the top skin may otherwise be damaged. Existing repair techniques involve removing and then replacing a portion of the top skin with a patch which overlaps the existing top skin. Perforations may be formed on the patch, but the perforations do not line up between the patch and the existing top skin in the overlap area, such that the acoustic properties of the acoustic panel are diminished in the overlap area.

SUMMARY

A method of repairing an acoustic panel for an aircraft may comprise coupling a fiberglass ply to the acoustic panel; creating dimples in the fiberglass ply using a differential pressure, wherein the dimples are located within first perforations in the acoustic panel; coupling the fiberglass ply to a replacement patch; and drilling second perforations in the replacement patch.

In various embodiments, a perforated maskant may be coupled to the replacement patch. Third perforations may be blasted in the replacement patch. The dimples may be sanded off the fiberglass ply. The second perforations may be drilled at locations of the dimples. The second perforations may be aligned with the first perforations. The replacement patch may be bonded to the acoustic panel. The replacement patch may comprise a core portion, a ramp portion, and an overlap portion. Third perforations may be blasted in the core portion, and wherein the second perforations are drilled in the ramp portion and the overlap portion.

A method of repairing an acoustic panel may comprise removing a damaged section of the acoustic panel; laying up a plurality of composite plies into a replacement patch on a bond tool; coupling a maskant to the replacement patch; blasting first perforations in a core portion of the replacement patch; placing a fiberglass ply on the acoustic panel; creating dimples in the fiberglass ply corresponding to second perforations in a top skin of the acoustic panel; transferring the fiberglass ply to the replacement patch; sanding off the dimples; drilling third perforations in a ramp section of the replacement patch; and coupling the replacement patch to the acoustic panel.

In various embodiments, the acoustic panel and the fiberglass ply may be placed in a bag, and a vacuum may be created within the bag. The dimples may be created using a pressure differential. Fourth perforations may be drilled in an overlap portion of the replacement patch. The third perforations may be aligned with the second perforations. The replacement patch may comprise a core portion, a ramp portion, and an overlap portion.

A method of repairing an acoustic panel may comprise removing a damaged portion of a perforated skin on the acoustic panel; forming a patch to fit in place of the damaged portion, wherein the patch comprises an overlap area with the perforated skin; perforating the patch to match a perforation pattern on the perforated skin; aligning the patch on the acoustic panel such that first perforations in the patch are aligned with second perforations in the perforated skin; and bonding the patch to the acoustic panel.

In various embodiments, a fiberglass ply may be coupled to the acoustic panel. Dimples in the fiberglass ply may be created using a differential pressure, wherein the dimples are located within the second perforations. The fiberglass ply may be coupled to the patch. The dimples may be sanded.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 4A illustrates a schematic cross-section view of a replacement patch in accordance with various embodiments;

FIG. 4B illustrates a schematic cross-section view of a replacement patch with a maskant in accordance with various embodiments;

FIG. 4C illustrates a schematic cross-section view of a replacement patch with perforations in a core portion in accordance with various embodiments

FIG. 6A illustrates a fiberglass ply coupled to a replacement patch in accordance with various embodiments;

FIG. 6B illustrates a fiberglass ply coupled to a replacement patch after the dimples have been sanded off in accordance with various embodiments;

FIG. 6C illustrates a replacement patch with perforations drilled in the overlap portion and the ramp portion in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
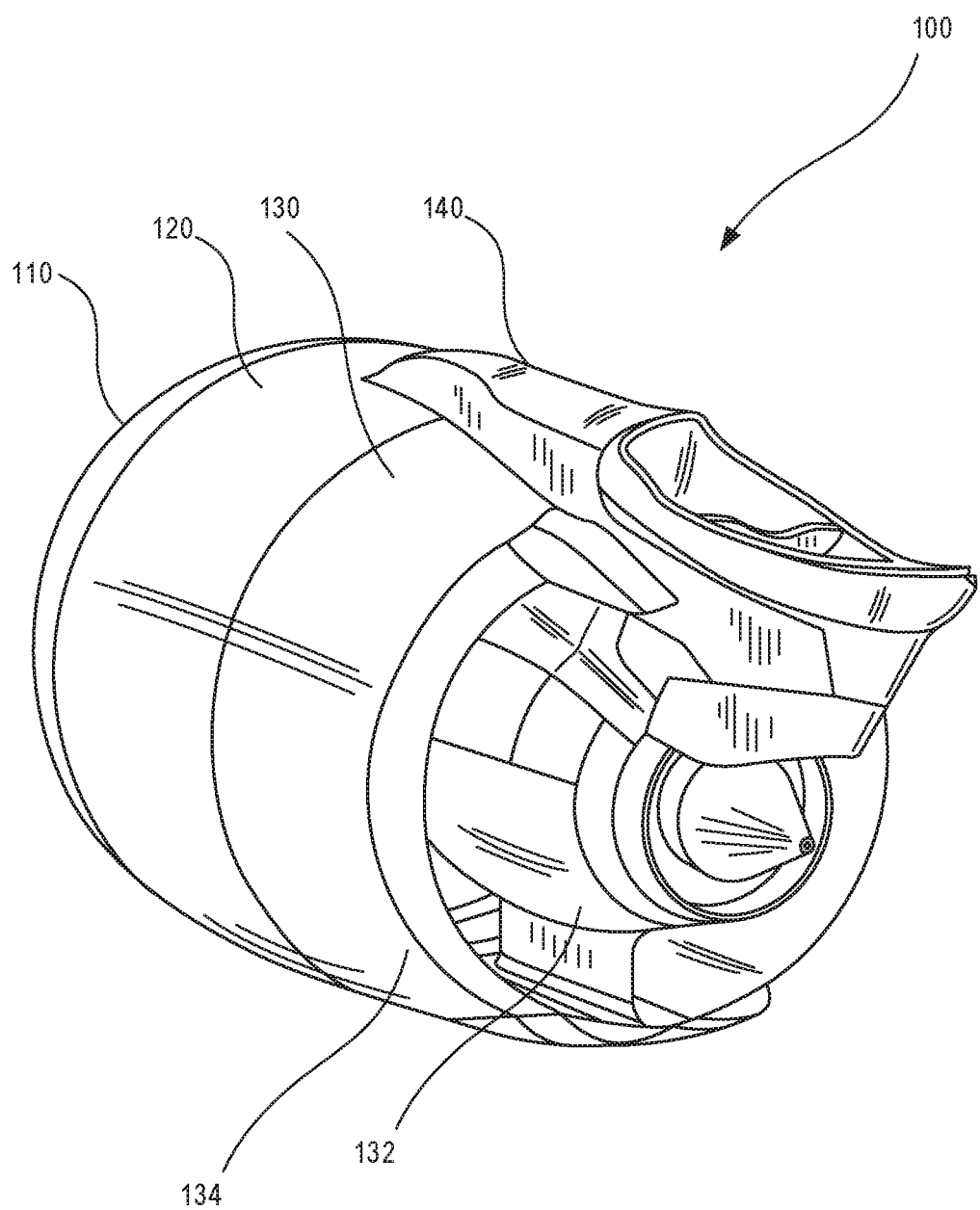
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Thrust reverser 130 may comprise an inner fixed structure ("IFS") 132, an outer fixed structure ("OFS"), and a translating sleeve 134. Bypass air from an engine fan may flow in a generally annular bypass air duct defined between the IFS 132 and the translating sleeve 134. Portions of the inner fixed structure 132, the translating sleeve 134, and the inlet 110 may be commonly formed using acoustic panels.

Figure 2:
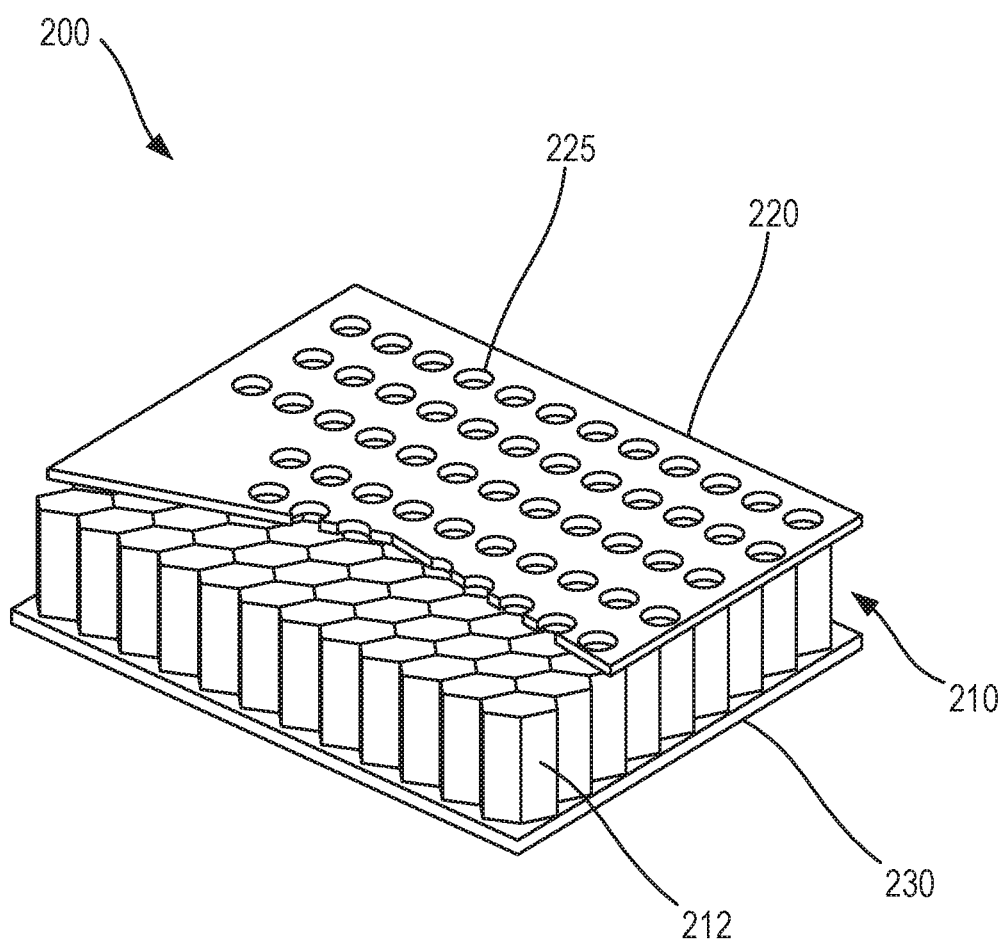
FIG. 2 illustrates a perspective view of an acoustic panel in accordance with various embodiments.

Referring to FIG. 2, an acoustic panel 200 is illustrated according to various embodiments. The acoustic panel 200 may comprise perforations 225, and could be used to form portions of a nacelle for an aircraft engine, as described above. The acoustic panel 200 may comprise a core 210, positioned between a first skin 220 and a second skin 230. The core 210 may have walls extending generally in a normal direction from the first skin to the second skin that form a plurality of cells 212. The cells 212 may be hexagonal in shape and are then commonly referred to as honeycomb core. In various embodiments, however, the cells 212 could have any of a number of different geometries. Core walls could be made from various metals such as titanium or aluminum, or composites, or hardened paper or other plastics, according to the particular application and material properties. Adjacent core walls may be bonded to each other with glue or may be welded, or other methods may be used to join core walls together to form the cellular structure. The first skin 220, core 210, and second skin 230 combine to form closed cells that may become resonator chambers when one of the skins is perforated and work to attenuate acoustic waves, such as noise from an aircraft engine, in a known fashion. The first and second skins 220, 230 may be formed of laminar plies of fiber reinforcement joined together with a matrix. The fibers may be carbon, glass, aramid or other known types. The matrix may be thermoset polymers such as epoxies, thermoplastics, and other known materials. The acoustic panel 200 is formed by joining together the first skin 220, second skin 230, and core 210, which may be done with adhesive, co-curing, mechanical fastening, or through other means. In the case of an adhesively bonded acoustic panel, the edges of the core walls adjacent to each skin are bonded thereto to form a rigid, high strength structure.

In various embodiments, a portion of the first skin 220 may not be fully attached to the core 210 during manufacture of the acoustic panel 200, or the portion may delaminate from the core 210, resulting in a void, or the first skin 220 may become damaged during operation. It may be desirable to repair the first skin 220 by replacing a portion of the first skin 220 with a patch.

Figure 3:
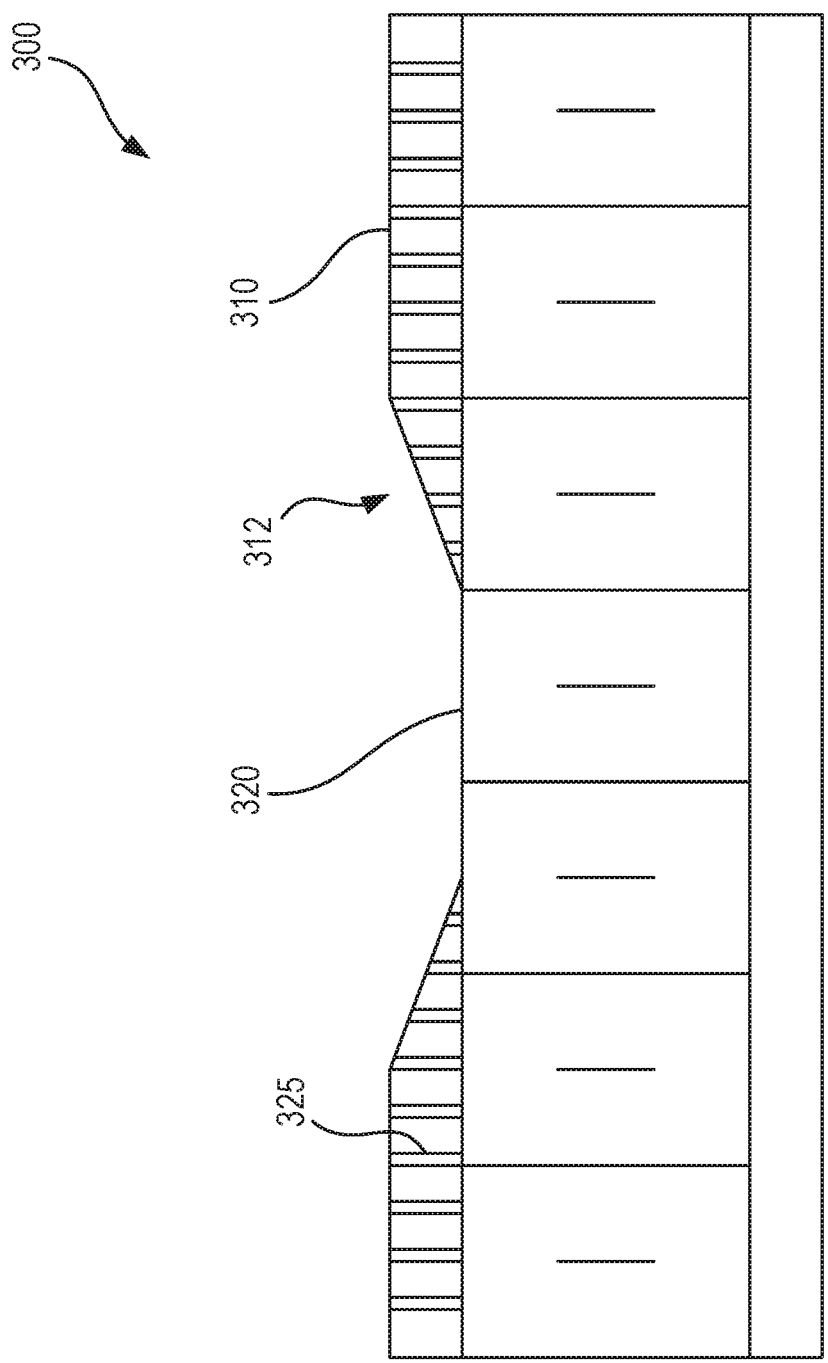
FIG. 3 illustrates a schematic cross-section view of an acoustic panel with a damaged portion of a perforated top skin removed in accordance with various embodiments.

Referring to FIG. 3, a schematic cross-section view of an acoustic panel 300 with a damaged portion of a perforated top skin 310 removed is illustrated according to various embodiments. The damaged portion may be cut with a continuously sloped ramp portion 312 between the top of the top skin 310 and the core section 320 where the top skin 310 is completely removed. However, in various embodiments, the damaged portion may be cut with a stepped profile. In various embodiments, the acoustic panel 300 may be curved in two or three dimensions. The curved shape may make it difficult to align perforations 325 between the remaining top skin and a replacement patch.

Referring to FIGS. 4A-4C, a schematic cross-section view of a replacement patch 400 is illustrated according to various embodiments. The replacement patch 400 may comprise a plurality of composite plies. The plies may be laid up on a bond tool which matches the shape of the component which is being repaired. The replacement patch 400 may comprise a core portion 401 which is configured to be placed directly over the core of an acoustic panel where the original top skin is completely removed. The replacement patch 400 may comprise a ramp portion 402 which is configured to be placed where the original top skin is partially removed. The replacement patch 400 may comprise an overlap portion 403 which is configured to be placed over the original top skin.

Referring to FIG. 4B, a maskant 410 may be coupled to the replacement patch 400. The maskant 410 may be a polymeric material. The maskant 410 may comprise a plurality of apertures 415 matching a perforation pattern of an acoustic panel. A tape 420 may be coupled to the replacement patch 400 or the maskant 410 over the ramp portion 402 and the overlap portion 403.

Referring to FIG. 4C, perforations 431 may be created in the core portion 401 with a blasting process. An abrasive material may be blasted at the replacement patch 400. In various embodiments, the abrasive material may comprise aluminum oxide, silicon carbide, or any other suitable abrasive material. The maskant 410 and the tape 420 may prevent the abrasive material from removing material from the replacement patch 400, other than through the apertures 415 in the maskant 410. The blasting may create the perforations 431 in the core portion 401.

Figure 5A:
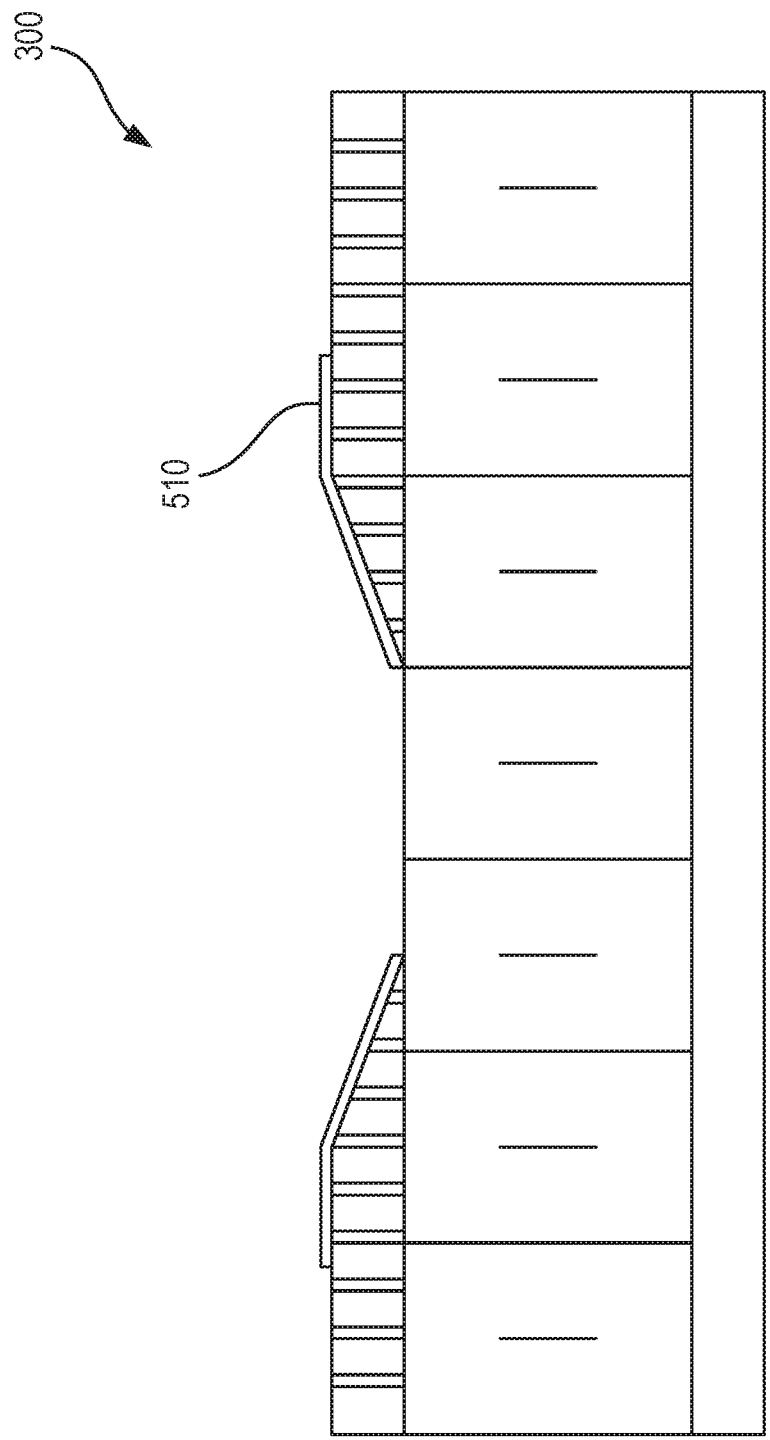
FIG. 5A illustrates a schematic cross-section view of an acoustic panel with an uncured fiberglass ply in accordance with various embodiments.

Referring to FIG. 5A, an uncured fiberglass ply 510 may be coupled to the acoustic panel 300. In various embodiments, a single ply may be used. However, in various embodiments, a plurality of plies may be used.

Figure 5B:
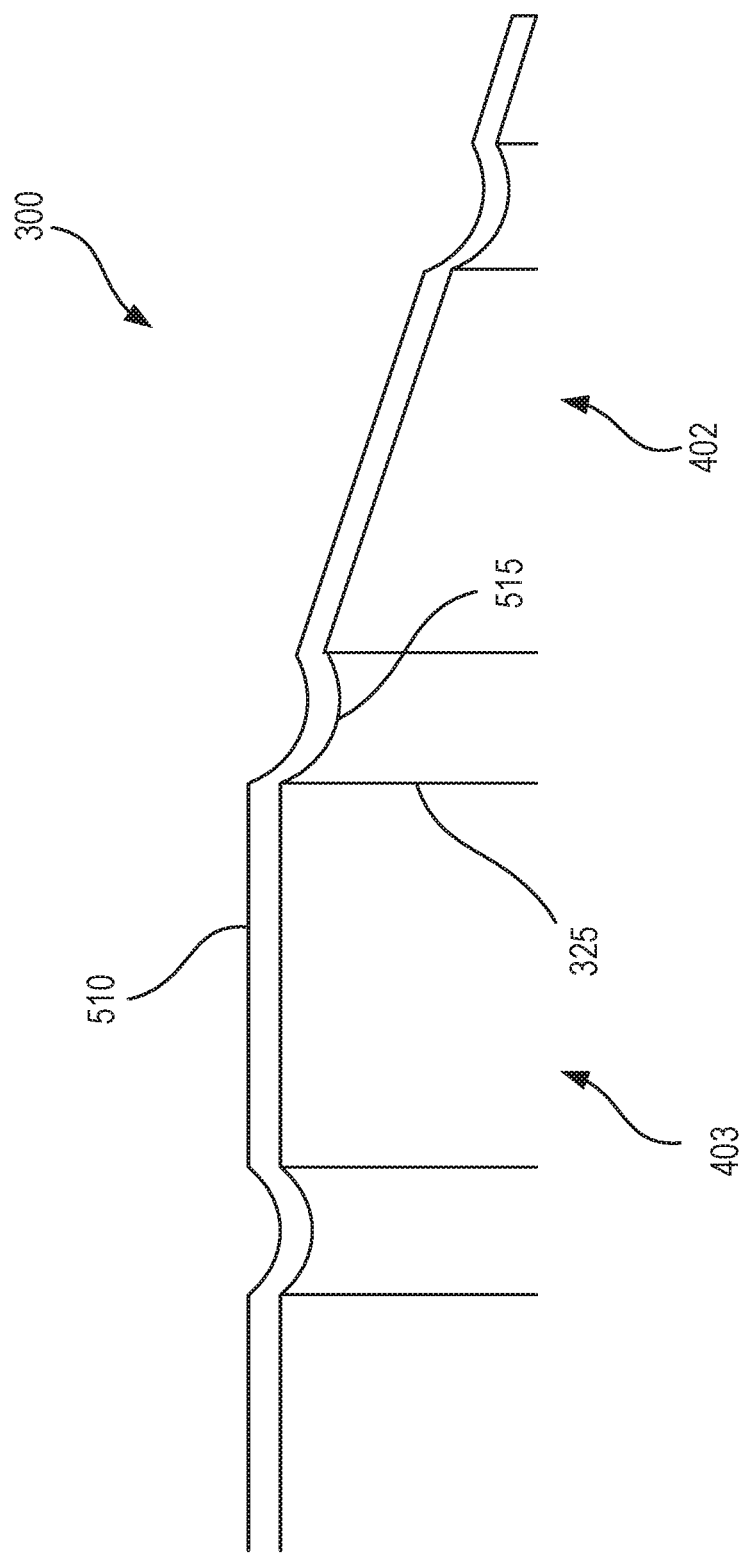
FIG. 5B illustrates a schematic cross-section view of an acoustic panel with a fiberglass ply with dimples in accordance with various embodiments

Referring to FIG. 5B, the acoustic panel 300 and the fiberglass ply 510 may be vacuum bagged, and a pressure differential may force the fiberglass ply 510 to droop into the perforations 325 in the ramp portion 402 and the overlap portion 403, creating dimples 515 within the perforations 325.

Referring to FIGS. 6A-6C, the fiberglass ply 510 may be removed from the acoustic panel and coupled to the replacement patch 400. The dimples 515 corresponding to the perforations in the acoustic panel may remain present as raised bubbles relative to the flat portions of the fiberglass ply 510.

Referring to FIG. 6B, the fiberglass ply 510 may be sanded. The sanding may remove the dimples 515 from the fiberglass ply 510. The fiberglass ply 510 may be left with apertures 516 where the dimples were formerly located which correspond to the perforations in the acoustic panel. Thus, the fiberglass ply 510 may provide a perforation template matching the acoustic panel.

Referring to FIG. 6C, perforations 632, 633 may be drilled in the ramp section 402 and the overlap section 403 of the replacement patch. The perforations 632, 633 may be drilled through the apertures 517 in the fiberglass ply 510. Thus, the perforations 632, 633 may match the perforation pattern of the acoustic panel. In various embodiments, the perforations 632, 633 may be laser drilled or drilled with a mechanical drill.

Figure 7:
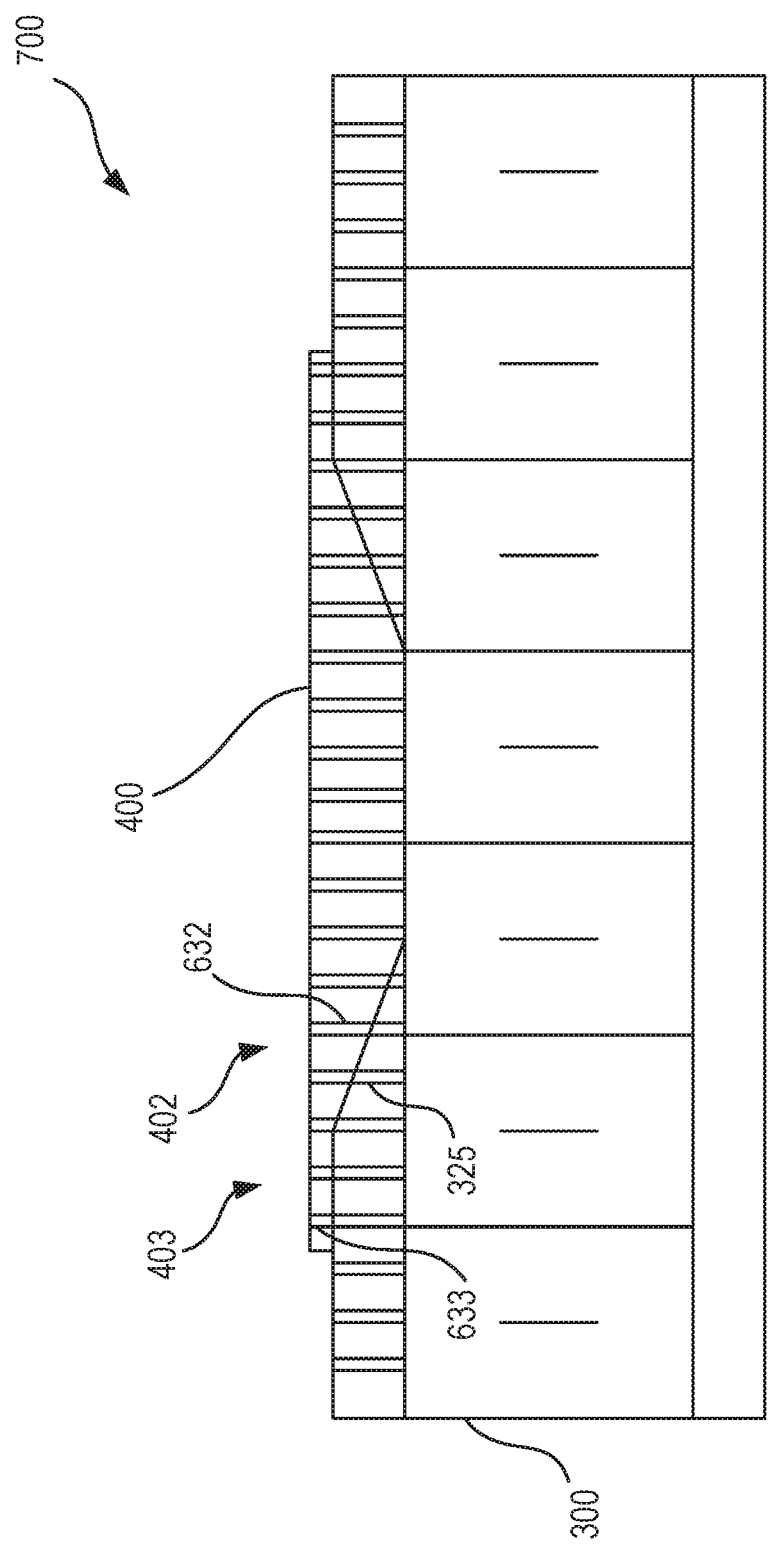
FIG. 7 illustrates a repaired acoustic panel, in accordance with various embodiments.

Referring to FIG. 7, a repaired acoustic panel 700 is illustrated according to various embodiments. The replacement patch 400 may be bonded to the acoustic panel 300. The perforations 632, 633 in the ramp section 402 and the overlap section 403 of the replacement patch 400 may align with the perforations 325 in the acoustic panel 630. One or more pins may be inserted through the perforations 325, 632, 633 to keep the replacement patch 400 in place during curing. An adhesive may be placed on the replacement patch 400 and/or the acoustic panel 300 between the replacement patch 400 and the acoustic panel 300. The acoustic panel 300 with the replacement patch 400 may be cured in an autoclave. The repaired acoustic panel 700 may then be ready for operational use.

Figure 8:
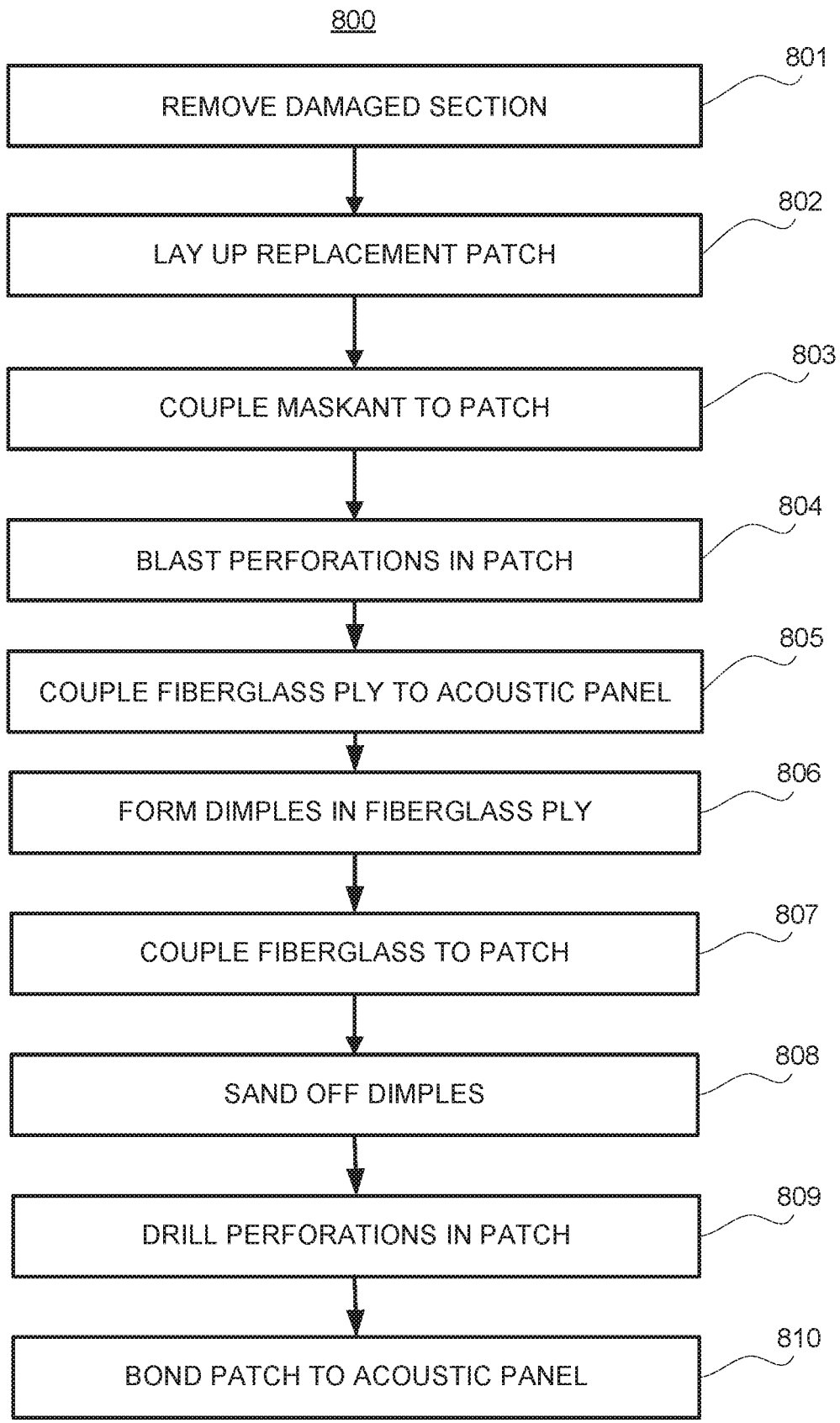
FIG. 8 illustrates a flowchart of a process for repairing an acoustic panel in accordance with various embodiments.

Referring to FIG. 8, a flowchart 800 of a process for repairing an acoustic panel is illustrated according to various embodiments. Damage may be detected in an acoustic panel. The damaged section may be removed from the acoustic panel (step 801). A replacement patch may be laid up using a bond tool matching the shape of the acoustic panel (step 802). A perforated maskant may be coupled to the replacement patch (step 803). Perforations may be blasted in the replacement patch (step 804). The perforations may match the perforations in the maskant. A fiberglass ply may be coupled to the acoustic panel (step 805). The acoustic panel may be enclosed in a vacuum bag, such that the fiberglass ply droops into perforations in the acoustic panel, forming dimples in the fiberglass ply (step 806). The fiberglass ply may be removed from the acoustic panel and coupled to the replacement patch (step 807). The dimples in the fiberglass ply may be sanded off (step 808). Perforations may be drilled in the ramp section and overlap section of the replacement patch according to the pattern of the fiberglass ply (step 809). The replacement patch may be aligned with the acoustic panel and bonded to the acoustic panel (step 810).

In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method of repairing an acoustic panel for an aircraft nacelle comprising:
   coupling a fiberglass ply to the acoustic panel;
   creating dimples in the fiberglass ply using a differential pressure, wherein the dimples are located within first perforations in the acoustic panel;
   coupling the fiberglass ply to a replacement patch; and
   drilling second perforations in the replacement patch.

2. The method of claim 1, further comprising coupling a perforated maskant to the replacement patch.

3. The method of claim 2, further comprising blasting third perforations in the replacement patch.

4. The method of claim 1, further comprising sanding the dimples off the fiberglass ply.

5. The method of claim 1, wherein the second perforations are drilled at locations of the dimples.

6. The method of claim 1, further comprising aligning the second perforations with the first perforations.

7. The method of claim 1, further comprising bonding the replacement patch to the acoustic panel.

8. The method of claim 1, wherein the replacement patch comprises a core portion, a ramp portion, and an overlap portion.

9. The method of claim 8, wherein third perforations are blasted in the core portion, and wherein the second perforations are drilled in the ramp portion and the overlap portion.

10. A method of repairing an acoustic panel comprising:
removing a damaged section of the acoustic panel;
laying up a plurality of composite plies into a replacement patch on a bond tool;
coupling a maskant to the replacement patch;
blasting first perforations in a core portion of the replacement patch;
placing a fiberglass ply on the acoustic panel;
creating dimples in the fiberglass ply corresponding to second perforations in a top skin of the acoustic panel;
transferring the fiberglass ply to the replacement patch;
sanding off the dimples;
drilling third perforations in a ramp section of the replacement patch; and
coupling the replacement patch to the acoustic panel.

11. The method of claim 10, further comprising placing the acoustic panel and the fiberglass ply in a bag and creating a vacuum within the bag.

12. The method of claim 10, wherein the dimples are created using a pressure differential.

13. The method of claim 10, further comprising drilling fourth perforations in an overlap portion of the replacement patch.

14. The method of claim 10, further comprising aligning the third perforations with the second perforations.

15. The method of claim 10, wherein the replacement patch comprises the core portion, a ramp portion, and an overlap portion.

16. A method of repairing an acoustic panel comprising:
removing a damaged portion of a perforated skin on the acoustic panel;
forming a patch to fit in place of the damaged portion, wherein the patch comprises an overlap area with the perforated skin;
perforating the patch to match a perforation pattern on the perforated skin;
aligning the patch on the acoustic panel such that first perforations in the patch are aligned with second perforations in the perforated skin; and
bonding the patch to the acoustic panel;
comprising coupling a fiberglass ply to the acoustic panel;
comprising creating dimples in the fiberglass ply using a differential pressure, wherein the dimples are located within the second perforations.

17. The method of claim 16, further comprising coupling the fiberglass ply to the patch.

18. The method of claim 17, further comprising sanding off the dimples.

* * * * *